United States Patent [19]

Wunning

[11] Patent Number: 4,877,396
[45] Date of Patent: Oct. 31, 1989

[54] INDUSTRIAL BURNER WITH CYLINDRICAL CERAMIC RECUPERATIVE AIR PREHEATER

[75] Inventor: Joachim Wunning, Leonberg, Fed. Rep. of Germany

[73] Assignee: WS Wärmeprozesstechnik GmbH, Renningen, Fed. Rep. of Germany

[21] Appl. No.: 291,744

[22] Filed: Dec. 29, 1988

[30] Foreign Application Priority Data

Jan. 15, 1988 [EP] European Pat. Off. ........ 88100498.0

[51] Int. Cl.$^4$ .......................... F23R 3/00; F23D 11/44
[52] U.S. Cl. ..................... 431/158; 431/166; 431/215
[58] Field of Search ............... 431/158, 161, 166, 215, 431/167; 432/174, 178; 165/165

[56] References Cited

U.S. PATENT DOCUMENTS

| | | | |
|---|---|---|---|
| 3,163,202 | 12/1964 | Schmidt et al. | 431/215 |
| 3,285,240 | 11/1966 | Schmidt | 431/215 X |
| 4,126,178 | 11/1978 | Kelm | 165/165 |
| 4,306,858 | 12/1981 | Simon | 431/215 X |
| 4,321,964 | 3/1982 | Förster et al. | 165/165 |
| 4,364,726 | 12/1982 | Forster et al. | 431/215 |
| 4,373,903 | 2/1983 | Wünning | 431/215 |
| 4,392,818 | 7/1983 | Wünning | 431/215 |
| 4,586,894 | 5/1986 | Wunning | 431/158 |

FOREIGN PATENT DOCUMENTS

| | | | |
|---|---|---|---|
| 223729 | 3/1962 | Austria | 431/215 |
| 12308 | 6/1980 | European Pat. Off. | |
| 25980 | 4/1983 | European Pat. Off. | |
| 2805817 | 3/1982 | Fed. Rep. of Germany | |
| 3422229 | 6/1986 | Fed. Rep. of Germany | |
| 60-114616 | 10/1985 | Japan | |

Primary Examiner—Margaret A. Focarino
Attorney, Agent, or Firm—Frishauf, Holtz, Goodman & Woodward

[57] ABSTRACT

The heat recuperator of a burner for an industrial furnace makes use of a substantially cylindrical body of ceramic produced by extrusion in which there are two interleaved sets of parallel channels, one set for the flow of combustion product gases out of the furnace and another set for the supply of air to be preheated in the recuperator and delivered to a combustion chamber coaxial with the recuperator and possibly located at least in part in the end portion of the cavity surrounded by the cylindrical ceramic body. The combustion product gases and the air being preheated flow in countercurrent and the disposition of the sets of channels facilitates heat transfer. The combustion chamber is constituted entirely of ceramic parts. A jet nozzle is provided on the outlet side of the combustion chamber and a fuel lance passing through the middle of the recuperator body and into the combustion chamber may also serve to adjust the jet nozzle by means of a valve body around its tip. Some of the air supply from the recuperator may discharge just outside of the combustion chamber so that a two-stage combustion may be provided, beginning with incomplete combustion in the combustion chamber.

21 Claims, 8 Drawing Sheets

INDUSTRIAL BURNER WITH CYLINDRICAL CERAMIC RECUPERATIVE AIR PREHEATER

This invention concerns an industrial burner with recuperative air preheating for heating of furnaces and other high-temperature heat treatment installations, more particularly a burner of the kind utilizing a ceramic combustion chamber having a fuel and air supply at its input and a gas outlet incorporating or connected to a jet producing nozzle. It concerns particularly the kind of burner having a tubular recuperator coaxial with the combustion chamber and having longitudinal channels through which there flow in countercurrent the combustion product gases on the one hand and the air supply on the other, so disposed that these two gas flows are thermally coupled together through internal wall portions of the recuperator. At least some of the air flow channels proceeding from an air supply installation are connected at their other end with the combustion chamber.

An industrial burner of the above-described kind is known from German Pat. No. 34 22 229. The construction of this burner is so designed that from the combustion air which is preheated in the recuperator, the so-called primary air is mixed with fuel in the combustion chamber resulting in the production of hot gases flowing out at high speed of a jet nozzle as the result of incomplete combustion of the fuel in the combustion chamber. The residual of the heated air quantity necessary for the completion of combustion flows out of a residual air chamber connected with the recuperator and surrounding the combustion chamber, flowing out through nozzle apertures arranged in a ring around the outlet of the combustion chamber, producing residual air jets of high velocity. In that way a two-stage combustion is obtained which leads to presence of low nitrogen oxide ($NO_x$) content of the combustion product gases and thereby to a correspondingly low burden on the environment. The recuperator which operates in countercurrent consists of three coaxial steel tubes set one within the other. The middle tube forms the heat exchange surface and coaxial channels of annular cross section are respectively bounded by the inner and outer tubes and are respectively traversed by the air to be preheated and by the hot effluent gases. The middle tube is equipped with ribs for improving the heat transfer. Such ribs extend into both of the annular channels.

Since the length of such a recuperator is generally limited for reasons of construction, the heat exchange surface can be increased only in proportion with the diameter. That means that high heat handling capability can be obtained only with large recuperator diameters. With an increasing ratio of inner to outer diameter, however, problems result because the ribs seated on the middle tube may not be allowed to extend beyond a certain radial dimension for reasons of their efficiency.

Especially at high temperature operation, construction of the combustion chamber and the jet nozzle of ceramic material provides a substantial improvement of the resistance of these parts to erosion compared with industrial burners with combustion chambers and jet nozzles of steel, but the connection of a ceramic combustion chamber with a recuperator made of steel involves a considerable construction expense to provide an essentially air-tight and gas-tight connection. Because of the different levels of expansion coefficients of ceramic material and steel, special precautions must be taken in order to protect against thermal stresses, particularly in the walls of the ceramic combustion chamber which is exposed to breaking stresses. Furthermore, corrosive components in the effluent gases flowing out through the recuperator create erosion problems in recuperators made of steel, against which precautions must be taken to prevent the effluent gas temperature from exceeding a value of about 1100° C. in view of the limited heat resistance of steel.

In contrast to what has just been described, the ceramic heat exchanger known from U.S. Pat. No. 4,126,178 is suitable for high gas temperatures. It was designed for installation as a recuperator for gas turbines or Stirling engines and consists essentially of an extruded monilithic ceramic honeycomb structure which has a matrix of thin walls. A multiplicity of essentially parallel cells in the form of passages between opposite end faces of the body are bounded by these thin walls. These cells form flow channels for heat exchanging media flowing therethrough in countercurrent. They can be closed in groups at one end and laterally opened in the vicinity of the closed end-faces, so that there are provided at the respective ends and/or in the region side surfaces of the honeycomb structure, the necessary inlets and outlets for the heat exchanging media, selectively usable in accordance with the requirements of the particular installation. These inlets and outlets can be connected with corresponding medium supply and discharge systems. It is indeed mentioned that such ceramic honeycomb bodies can also find application as heat exchangers or afterburners for reducing the heat energy dissipation in certain industrial furnaces, but beyond that the disclosure lacks any suggestion for the corresponding type of construction. Because of the through-penetration honeycomb structure of the body that is rectangular in overall cross section, no combustion reaction can take place within the space occupied by the honeycomb body itself.

Finally, a recuperative heat exchanger of ceramic material is also known from German Pat. No. 28 05 817 which is constituted in the form of an extruded body in the shape of a hollow cylinder, in the walls of which there run channels disposed one next to the other and distributed circumferentially around the longitudinal axis of the body, through which channels heat exchange media may flow in countercurrent. The essentially silt-like axially running flow channels are alternately offset radially with respect to each other, so that for the provision of inlet and outlet openings at least a part of the inner or outer enclosing wall of the hollow cylindrical body is so far offset in regions adjacent to the ends of the body that in every case the flow channels projecting into the offset region are opened there. When the axially running flow channels are closed at their ends, both the inner wall nearer the axis of rotation and also the outer wall are cut short for forming the inlet and outlet openings. The ceramic heat exchanger is then connectable to supply and discharge ducts for the media that are subject to heat exchange, so that both the media flow axially through the heat exchange matrix and are supplied and discharged in a radial direction.

A basically similar ceramic heat exchanger of hollow cylindrical construction is also known from European Pat. No. 0026 980. These heat exchangers serve as independent construction units simply for the heat exchange between two gaseous media flowing through them which are supplied and discharged through preferably collective supply and discharge devices.

SUMMARY OF THE INVENTION

It is an object of the present invention to provide an industrial burner, especially for heating of furnaces or other high temperature heat treatment installations which are distinguished by an unusually simple construction which is reliable in operation and is capable of being produced at low cost and, operating at high thermal efficiency, is also suitable for use at high temperatures and/or in the presence of combustion product gases containing aggressive components.

Briefly, the recuperator is in the form of a substantially cylindrical hollow body of ceramic material the walls of which channels are distributed adjacent to each other annularly around its longitudinal axis. The combustion chamber is disposed either at least in part in the inner space surrounded by the inner wall of the hollow cylindrical body or else directly adjacent to an end boundary of the hollow cylindrical body. The channels in which the air flows for preheating discharge at the end of the hollow cylindrical body in the region of the combustion chamber. A jet nozzle at the outlet end of the combustion chamber is constituted by means passing through the cavity within the inner boundary wall of the hollow cylindrical body or connected to the hollow cylindrical body or both passing through the hollow cylindrical body and connected to the hollow cylindrical body.

As the result of the combustion chamber disposed at least partly in the inner space of the ceramic hollow cylindrical recuperator body and/or directly attached to an end boundary of that body, there results a very simple burner construction utilizing easily producible parts. A ceramic material of good heat conducting capability and resistant to large changes of temperature can be used for the hollow cylindrical body. Its manufacture can be performed in a particularly simple way by extrusion on a suitably equipped extrusion press. The ceramic material is to a great extent resistant to aggressive components contained in the combustion product gases, with the result that the entire burner is distinguished by a high resistance to erosion during its use. At the same time it can if needed also operate at high gas temperatures.

The combustion chamber can simply and conveniently have the form of a section of the inner space of the hollow cylindrical body directly bounded laterally by the inner wall of that hollow body Alternatively, however, the design can also be such that the combustion chamber has at least one annular or pot-shaped combustion chamber element attached to the hollow cylindrical body that can usefully consist of a ceramic material which is different from that of the hollow cylindrical body. Thus there is the possibility of the use of a ceramic material of higher value for the combustion chamber element than for the extruded hollow cylindrical body. Furthermore, the jet-producing nozzle can also be formed by a part of this combustion chamber element or can be connected with that element.

Depending on the gas exit velocity out of the jet nozzle and the inner diameter of the hollow cylindrical body that may be required in the particular case, the inner wall of the hollow cylindrical body can be used to form the jet nozzle directly at its end orifice or, in the alternative, at least one ceramic nozzle body forming the jet nozzle can be connected to the hollow cylindrical body. This nozzle body can advantageously be constituted as a nozzle ring set into the inner space of the hollow cylindrical body at its gas exit. The nozzle ring should have a gas passage aperture area which is smaller than the cross section of the inner space surrounded by the hollow cylindrical body, so that the narrowing down produced by the nozzle ring can produce the increase of the gas exit velocity that may be necessary for the particular case. In case it is desired to subdivide the jet, a nozzle body can be used that has a plurality of separate nozzle orifices.

In order to diminish the $NO_x$ content in the combustion product gases and thereby to make possible an environment-friendly burner operation, it is known to operate a burner with so-called two-stage combustion. This can be achieved with the new industrial burner of the present invention in a particularly simple way. For this purpose, channels of the hollow cylindrical body guiding the combustion air are connected with air outlets in the neighborhood of the jet nozzle. In a preferred embodiment, these air outlets lie in the adjacent end boundary of the hollow cylindrical body in the neighborhood of the jet nozzle. The distribution of the combustion air heated in the recuperator portion of the hollow cylindrical body into a primary air quantity introduced into the combustion chamber exposed in the internal space of the hollow cylindrical body and into a supplemental residual air quantity discharged preferably endwise out of the hollow cylindrical body can take place in a simple manner when, in the hollow cylindrical body, a corresponding part of the channels guiding the combustion air are closed at the end boundary at which the jet nozzle is located and instead are opened towards the inner space of the hollow cylindrical body, while another portion of the channels guiding combustion air discharge freely through the end boundary of the preheater body without being connected with the inner space within the hollow cylindrical body.

The combustion chamber is advantageously closed off at its end opposite the jet nozzle by at least one closure member in the inner space of the hollow cylindrical body, which closure member has means for passage therethrough of at least the fuel supply duct. If the inner wall of the hollow cylindrical body directly closes off the combustion chamber laterally, a plug can be inserted into the inner space. If a separate combustion chamber element is inserted into the inner space, then either such a plug or else a special closure element, for example in the form of a plate, can be used which is seated on the combustion chamber element.

The axially running mutually adjacent flow channels provided in the structure of the hollow cylindrical body can themselves have any suitable profile. The arrangement of the channels can be fitted to the particular requirements and also to the requirements of the extrusion process. It has been found particularly useful, however, if the channels for the combustion product gases and the combustion air are disposed so as to run in alternately adjacent sectors of the hollow cylindrical body. Thus the walls separating the flow channels from each other can be very thin and of uniform construction, so that a good thermal efficiency of the recuperator will result.

All channels guiding combustion product gases and all channels guiding combustion air most usefully have the same effective hydraulic diameter, so that a uniform distribution over the aggregate cross-sectional surface of the hollow cylindrical body for the effluent gas throughput and for the air throughput can be obtained and thus also uniform heat exchange ratios. Practical experience has shown that it is advantageous for the effective hydraulic diameter to lie in the range from 2 to 10 mm.

Especially for larger dimensions it can become difficult or uneconomic to produce the ceramic hollow cylindrical body as a one-piece component. In this case it is practical for the hollow cylindrical body to be put together from at least two similar hollow cylindrical sectors, each of which can again be produced by extrusion.

The fuel supply for the combustion chamber is provided efficiently because the inner cavity of the hollow cylindrical body is available for the provision of the fuel supply structure. In order to make possible the fitting of the industrial burner to different installation requirements, it can be useful to design the equipment in such a way that the fuel supply duct is disposed coaxially to the longitudinal axis of the hollow cylindrical body within the inner space surrounded by that body and to provide an axially shiftable supply element which can form, together with the jet nozzle or with valve seat means, an adjustable valve for the gases flowing into the jet nozzle. In a further elaboration of this concept, this supply element can also be connected to a spring and membrane device by means of the spring of which the supply element can be urged against the jet nozzle or the valve seat means, while the membrane is in contact on one side with the atmosphere and on the other side with the pressure that reigns in the combustion chamber, so that the combustion chamber pressure is maintained constant independently of the input pressure.

Independently of the particular embodiment of the industrial burner of the invention, it is as a rule advantageous for the hollow cylindrical body to be provided with a heat-insulating outer shell over at least a part of its length in order to reduce heat losses to the exterior. Taking account of the importance of a simple mounting procedure, it is advantageous for the hollow cylindrical body, perhaps together with its heat insulating shell, to be set into a casing that is separable into parts and which is equipped with connection fittings that connect with the sets of channels of the recuperator when the casing is assembled. These include the connections for the waste combustion gases and for the combustion supporting air. The hollow cylindrical recuperator body, together with its combustion chamber and jet nozzle, should be removable from the casing in the direction opposite to that in which the jet nozzle is directed.

Finally, for purposes of installations in which a high heat transfer capability is involved, the installation can also be so designed that the new industrial burner according to the invention as above described can be combined with at least a second industrial burner into a combined burner means or unit in which the two or more hollow cylindrical bodies are held in a common casing that may, if desired, be separable into parts and permits unmounting of one or more of the hollow cylindrical bodies by simply pulling it out.

BRIEF DESCRIPTION OF THE DRAWINGS

The invention is further described by way of illustrative example with reference to the annexed drawings in which.

DESCRIPTION OF THE ILLUSTRATED EMBODIMENTS

Figure 1:
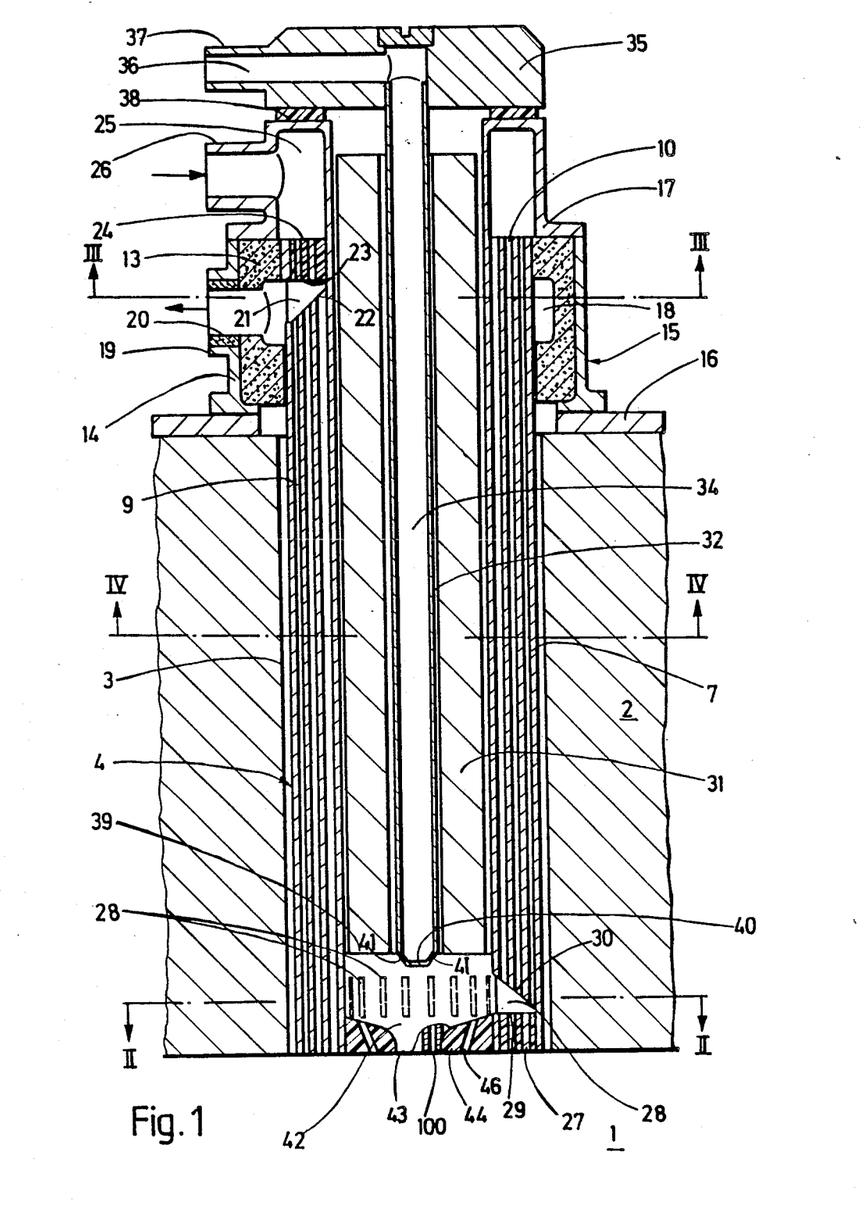
FIG. 1 is a longitudinal cross section, along the line I—I of FIG. 4, providing a side view of a first embodiment of an industrial burner according to the invention.
Figure 5:
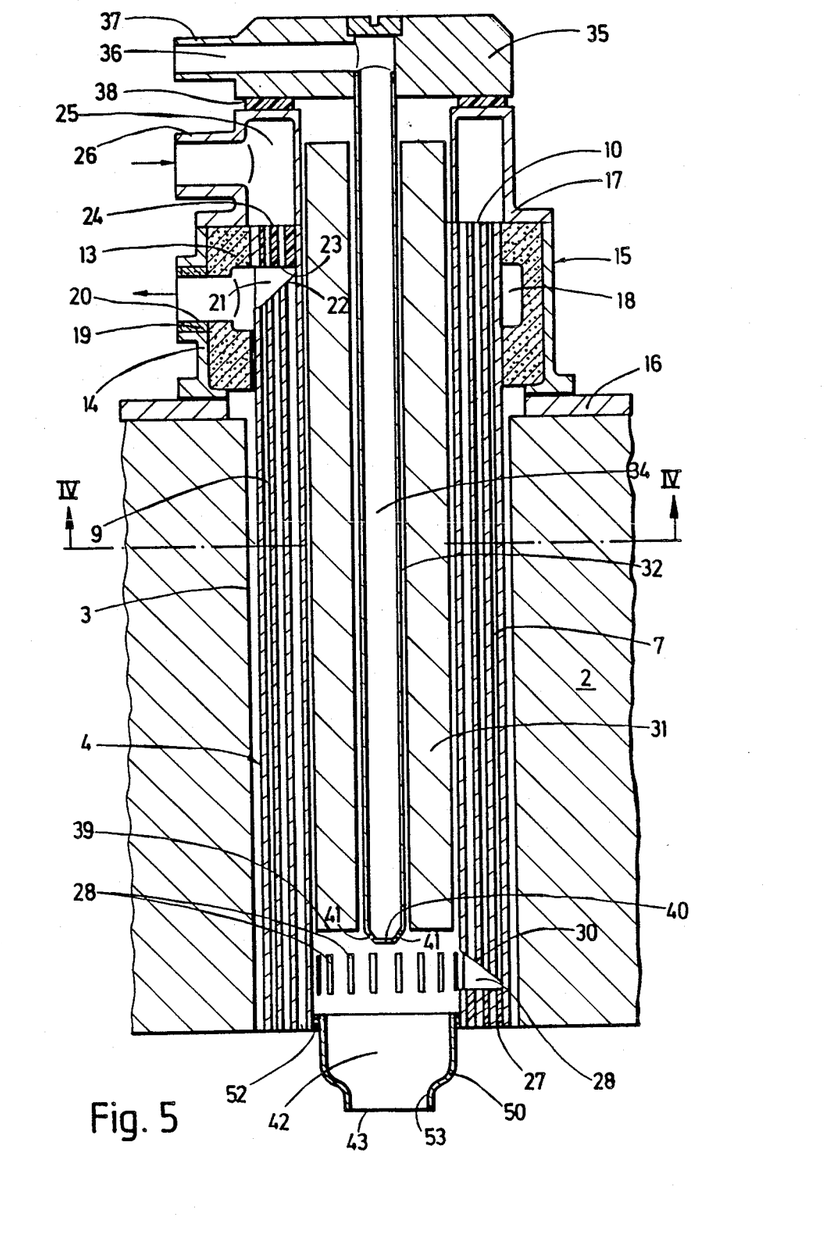
FIG. 5 is a cross section corresponding to FIG. 1 of a second and modified embodiment of an industrial burner according to the invention.
Figure 6:
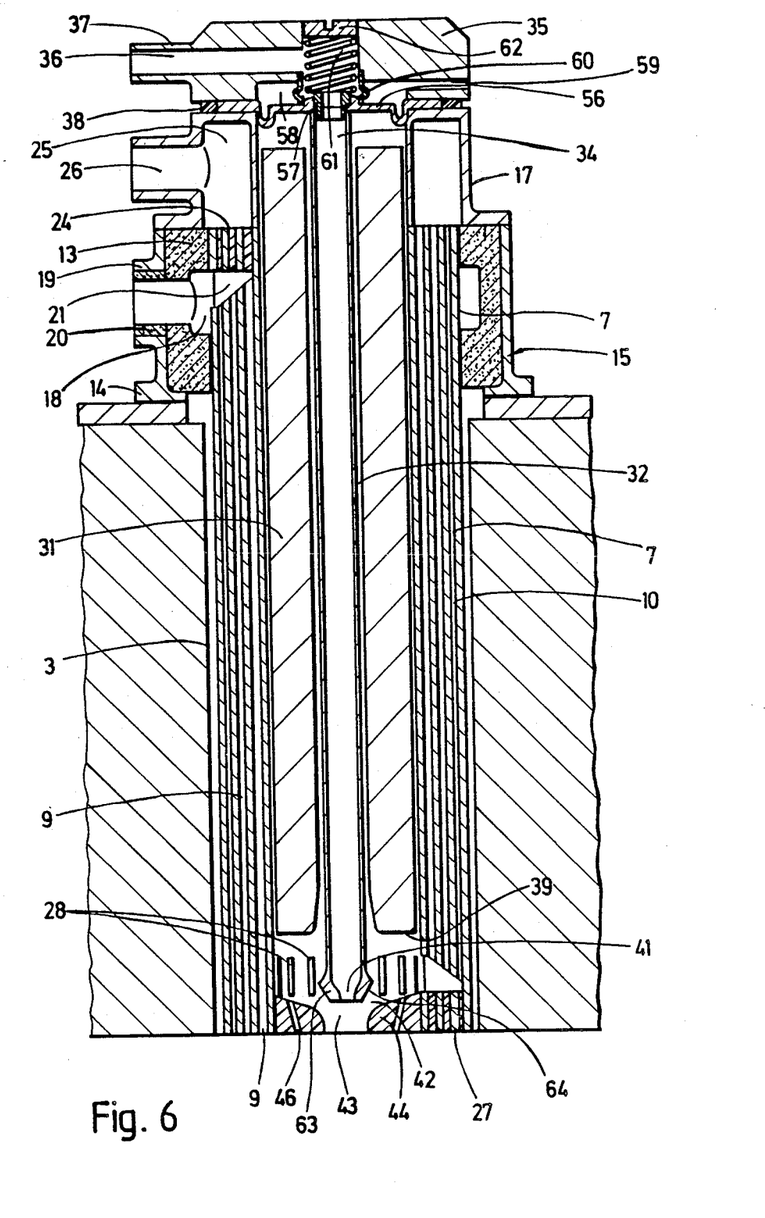
FIG. 6 is a cross section like that in FIG. 1 of a third and modified embodiment of an industrial burner according to the invention.

The industrial burner of the invention shown in several illustrative embodiments in the drawings is designed for heating with gaseous or liquid fuels and serves for heating the furnace chamber 1 of an industrial furnace, a wall of which is shown at 2 and is pierced by an aperture 3 into which the burner is installed (FIGS. 1, 5, 6).

The industrial burner operates with recuperative air preheating and has an elongate hollow cylindrical body 4 of a ceramic material of good heat conductivity and high resistance to temperature changes. The body 4 is produced by extrusion in an extrusion press. This ceramic hollow cylindrical body 4 encloses by its inner jacket wall 5 (FIGS. 3 and 4) a cylindrical cavity 6 and is closed off to the exterior along its circumference by a coaxial, continuous and smooth outer jacket wall 7. Within the annular wall structure of the hollow cylindrical body 4 there are distributed around the longitudinal axis 8 many axially running, parallel channels 9, 10 that are adjacent to each other, as shown in the embodiments illustrated in FIGS. 2–4 and 7, where the radial walls 11 and the annular walls 12 coaxial with the longitudinal axis 8 are shown bounding the channels. The walls 12 may of course be plane (polygonal) rather than curved.

As a result of the radial walls 11, there is a sector-shaped subdivision of the annular walls of the hollow cylindrical body 4, while the channels 9, 10 each have a constant cross-sectional shape over the entire length of the hollow cylindrical body 4. The thickness of the walls 11 and 12 separating neighboring channels 9, 10 from each other is in the range between 2 and 20 mm, preferably from about 5 to 10 mm, although naturally other wall thicknesses can be chosen according to the dimensions of the hollow cylindrical body and the specification requirements for the industrial burner.

The hollow cylindrical body 4 is surrounded at one end with a heat-insulating shell in the form of a ceramic body 13 somewhat resembling a thick annular disk, which is cemented or otherwise bonded in a temperature-resistant way to the outer wall 7 of the ceramic body 4. The ceramic body 13 is set in the annular lower portion 14 of a separable metal casing 15 (FIG. 1) which is fastened to the metallic outer wall 16 of the industrial furnace. A likewise metallic upper casing part 17 is connected gas-tight to the lower casing part 14 at a perpendicularly running joint surface so that the upper casing part 17 fixes the position of the ceramic body 13 axially. After removal of the upper casing part 17, the ceramic body 13 and the hollow cylindrical body 14 connected thereto and thereby the entire industrial burner can be pulled out of the lower casing part 14 so that very simple mounting arrangements are provided.

In the ceramic body 13 a ring channel 18 is formed which surrounds the outer jacket wall 7 of the hollow ceramic body 4. The channel 18 is connected with a waste gas discharge fitting 19 which in turn surrounds a discharge fitting 20 of the ceramic body 13. In the circumferential region of the hollow cylindrical body 4 lying inside the ring channel 18, slots 21 are cut which lead through the outer wall 7 and through inner partitions of the hollow cylindrical body 4 all the way to the inner jacket wall of that body without damaging that wall 5. These slots have a somewhat triangular profile shape with a more or less horizontally running upper side 23. As can be seen from FIG. 3, the slots 21 are distributed uniformly around the circumference of the hollow cylindrical body 4 so that they lie in uniformly distributed sectors in each of which three radially adjacent channels 9 are included. In each of the sector-shaped slots 21 that are laterally bounded by two smooth walls 11 three channels 9 of that sector have their orifices at the underside of the slots so that they are connected with the ring channel 18. The lower slot edges 22 which run obliquely to the nearby end-surface of the hollow cylindrical body 4 have the effect that the orifices of the channels 9 in the lower sides of a slot are axially offset with respect to each other, so that favorable discharge flow conditions result.

In the region of the other slot edge 23 lying substantially in a horizontal plane the channels 9 are closed at 24, with the result that the combustion product gases discharged through the outlet 19 in the direction shown by an arrow in FIG. 1 uniformly load the sector-shaped channels 9 distributed around the circumference of the body 4 and these bases, with reference to FIG. 1, flow in an upward direction within the hollow cylindrical body 4, which is closed gas-tight for the combustion product gases at its end-surface adjacent to the slots 21. The channels 9 are open at the opposite end of the hollow cylindrical body 4, so that the waste gases can freely flow into the channels 9 from the furnace interior space 1.

At the top of FIG. 1 a second ring channel 25 is provided in the upper casing part 17 above the adjacent end of the hollow cylindrical body 4. The ring channel 25 is connected with a nipple 26 for connection with a supply duct of a combustion air supply that is not shown. The channels 10, which in contrast to the channels 9 are open at the end of the hollow cylindrical body 4 adjacent to the second ring channel 25 connect with that second ring channel for input of air.

In the region of the opposite end of the hollow cylindrical body 4 these channels 10 into which the combustion air is forced to flow have a gas-tight closure as shown at 27. Just above this location in FIG. 1, however, the slots 28 are arranged which penetrate through the inner jacket wall 5 of the hollow cylindrical body 4 in a uniform distribution corresponding to the uniform distribution of the slots 21 or the channels 9 circumferentially of the hollow ceramic body 4 and, as shown in FIG. 1, these slots 28 extend all the way to the outer jacket wall 7 of the body 4 without cutting into or damaging that outer wall.

The sector-shaped slots 28, which are thus offset circumferentially and located at the opposite end longitudinally with respect to the slots 21 are likewise bounded laterally by two smooth jacket walls 11 and provide outlets discharging into the inner space 6 enclosed by the hollow cylindrical body 4 through which outlets combustion air flowing through the channels 10 is discharged. Each of the slots 28 is bounded by a side 29 running essentially in a horizontal plane not far from the end of the hollow cylindrical body 4 and is also bounded by an oblique side 30 running upward with respect to FIG. 1 from the narrow end of the slot. In this manner, the result is obtained that the orifices of the three channels 10 that are adjacent to each other in every sector of these channels distributed around the circumference of the hollow cylindrical body 4 are offset axially in the slot 28 into which they discharge in order to provide favorable outflow conditions for the combustion air.

A ceramic plug 31 of essentially annular sleeve shape is set into the internal space 6 of the hollow cylindrical body 4. It has a central bore 32 along its entire length through which a coaxial fuel lance 34 passes. The fuel lance 34 is sealed at one end to a cap plate 35 which contains a fuel supply channel 36 connected to the fuel lance 34. The channel 36 connects to a nipple 37 for attachment to a fuel supply that is not shown. The cap plate 35 is connected with the metal casing 15 with an elastic seal ring 38 interposed.

The axial length of the plug 31 is so dimensioned that it ends with its lower end surface 39 with reference to FIG. 1 located a small distance above the upper edge of the combustion air outlet slots 28. The fuel lance, which is closed except for the fuel outlet channels 41 at its extremity projects with that extremity slightly beyond the end surface 39 of the plug 31. The fuel outlet channels 41 thus open into a combustion chamber 42 bounded by the end surface 39 of the plug 31 and directly closed of by the inner wall 5 of the ceramic body 4. The air outlet slots 28 discharge into that combustion chamber.

At the side of the combustion chamber 42 opposite the end surface 39 the chamber is connected to a jet nozzle 43 coaxial with the longitudinal axis 8 of the ceramic body 4. The jet nozzle 43 is constituted by an annular ceramic nozzle body 44 which is inserted into the end of the inner space 6 underneath the air outlet slots 28 and is connected with the inner wall 5 of the body 4, for example cemented thereto. In the case of the industrial burners described up to this point, the ceramic hollow cylindrical body 4 provides for countercurrent flow of hot combustion gases from the furnace interior and combustion air supplied at the connection 26 and also contains in its inner cavity 6 the combustion chamber 42 which in the embodiment shown in FIG. 1 is laterally closed off directly by the inner wall 5. The jet nozzle 43 is, in addition, located in the outward side of the combustion chamber at the end of the hollow cylindrical body 4. It naturally forms the outlet side closure for the combustion chamber 42. In this manner the result is obtained that the recuperator 4, as well as the combustion chamber 42 and the jet nozzle 43, thus all the cavities exposed to high temperatures, are bounded only by ceramic wall portions.

In operation, the atomized or sprayed fuel issuing out of the fuel outlets 41 of the fuel lance 34 into the combustion chamber 42 is mixed with the air entering into the chamber 42 through the combustion air outlet slots 28. The combustion produces hot gases which rush out of the jet nozzle 43 into the furnace chamber 1, with the nozzle body 44 providing a narrowing down of the jet path to accelerate the gases to a high jet velocity.

In cases in which the subdivision of the jet is desirable, the nozzle body 44 can also be constituted with individual channels in a distributed pattern, such as are indicated at 46 in FIG. 1. It is also possible to close the central opening so that the nozzle body 44 takes the form of a perforated plate.

It is frequently desired to carry out the combustion in two stages in order to reduce the $NO_x$ content of the combustion product gases. For that purpose it necessary for the combustion air supplied through the channels 9 to be subdivided into a primary air quantity introduced through the outlet slots 28 into the combustion chamber 42 and a supplemental or residual air quantity which, in the form of supplemental air jets, are mixed with the gas jet issuing out of the jet nozzle 43. This subdivision is designed to produce only a partial combustion of the fuel of the primary air within the combustion chamber 42 and a complete afterburner combustion in the gas jet issuing out of the jet nozzle 43 by means of the supplemental air blown into it.

In order to achieve this two-stage combustion, a number of the channels 10 guiding the combustion air are left open at the end of the hollow cylindrical body facing the furnace chamber 1. With a corresponding distribution of the slots 28, the result is obtained that the channels 10 open at the end face of the body 4 are not connected with the combustion chamber 42 or, in special cases, are connected therewith only through a throttled connection. It is in principle conceivable to omit every other air outlet slot 28 in FIG. 1, reducing the number of slots by half, so that the corresponding channel 10 discharges at 100 in the end face of the body 4 or else to vary to depth of the slots 28 in such a way that in each sector a radially inwards lying channel 10 discharges into the combustion chamber whereas at least a radially outwards lying channel has its orifice in the end boundary of the body 4.

In this connection it should be mentioned that the end boundary of the hollow cylindrical body 4 facing the furnace chamber 1 can be provided not only in a plane configuration as illustrated , but also in some other shape that may be suitable for the purpose, for example concave, in order, for example, that the supplemental air jets issuing out of the channels 10 at the end face of the body 4 may be guided somewhat radially inwards or else convex so as to provide more favorable flow configurations for the combustion product gases entering the channels 9.

Figure 2:
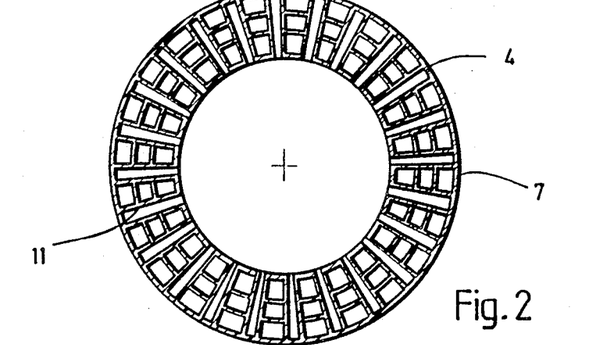
FIGS. 2, 3 and 4 respectively show cross sections along the lines II—II, III—III and IV—IV of FIG. 1.
Figure 3:
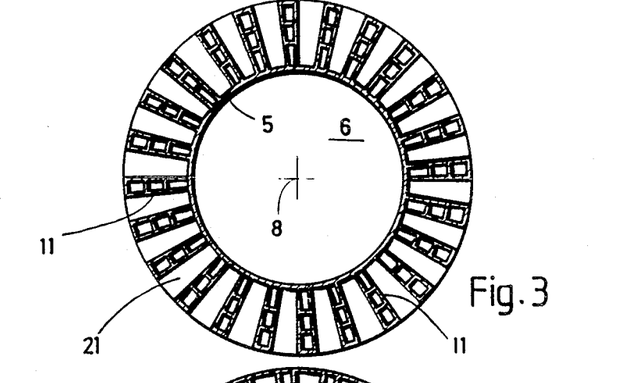
Figure 4:
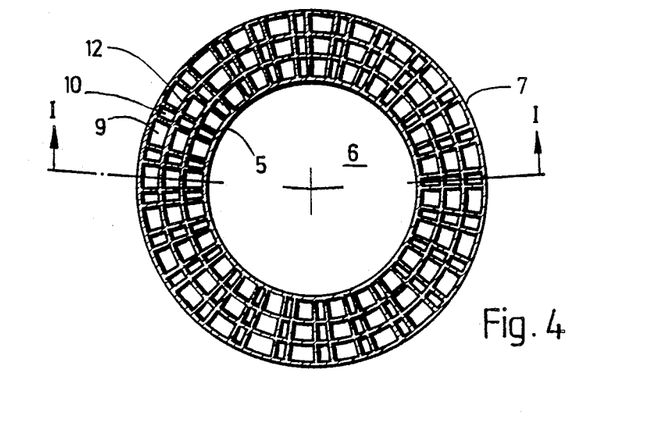

In the illustrative embodiments already described three waste gas channels 9 or three combustion air channels 10 are provided, as shown in FIGS. 2, 3 and 4, in each sector-shaped section of the body 4 in such a way that the respective sector regions for combustion gas and combustion supporting air may be separated from each other by radial walls 11 and be alternately located next to each other in the circumferential direction. Because of the hollow cylindrical shape of the body 4, the three channels 9 and the three channels 10 lying in such a circular annulus sector each have somewhat different cross-sectional shape. The arrangement is so designed, however, that all channels 9 and likewise all channels 10 have the same effective hydraulic diameter $d_n = 4 * F/U$. This can be obtained by corresponding selection of the diameter of the ring walls 12 and the subdivision of the walls 11. The purpose of this provision is to assure that at their input ends the channels 9 and likewise the channels 10, which are subjected to the same pressures, also guide gas flows of the same size, so that uniform heat exchange ratios result at all locations around the longitudinal axis in the hollow cylindrical body 4. The hydraulic effective diameter of the channels 9 containing the flow of combustion product gases can be different throughout from that of the channels 10 directing the combustion air flow. In the embodiments illustrated in FIGS. 1 to 4, the hydraulic effective diameter of a channel 10 is about twice as large as that of a channel 9. The hydraulic effective diameter $d_n$ advantageously lies in the region from 2 to 10 mm.

Figure 7:
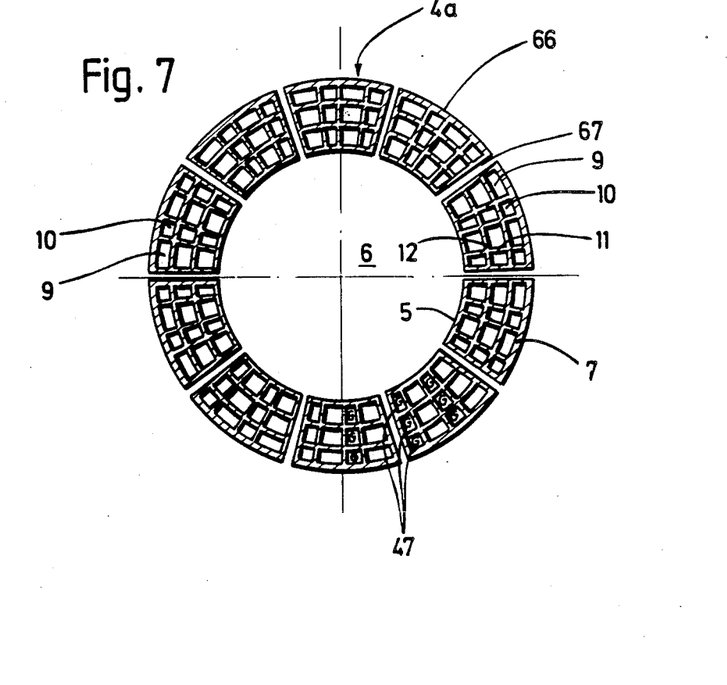
FIG. 7 is a cross section similar to FIG. 4 of a modified embodiment of a ceramic hollow cylindrical body of an industrial burner according to FIG. 1, FIG. 5 or FIG. 6.

In order to improve the heat exchange ratios between the combustion product gases and the combustion air in the portion of the hollow cylindrical body 4 acting as a recuperator, it is possible at least on the cold side to provide inserts in the channels 9 and/or 10 more or less in the form of inserted spirals, rods or the like as is schematically indicated at 47 in FIG. 7. These inserts prevent a laminar gas flow and produce a breaking up of the boundary layer at the channel walls.

Furthermore it is useful to hold constant the ratio of the inner to the outer diameter $D_i/D_o$ of the hollow cylindrical body 4 at a value between 0.5 and 0.7 and preferably about 0.6. For the same axial length for maintenance of the same hydraulic effective diameters of the channels 9 and 10, the heat exchange surface then rises with the square of the outer diameter $D_o$. Relatively large heat exchange capacities can therefore be obtained with relatively small space requirements.

If the industrial burner is operated with natural gas or other readily inflammable fuels, these must be supplied through the fuel lance 34 which leads directly into the combustion chamber 42 through the bore 32 of the plug 31. The bore diameter is then greater than the outer diameter of the fuel lance 34 so that heat insulation of the fuel lance is produced and cracking of the fuel flowing through the lance is thereby prevented.

If such an industrial burner is operated with a fuel that permits preheating of it, however, the construction can also be designed so that certain ones of the channels 10 otherwise allocated to combustion air and coupled thermally with channels 9 are utilized for fuel preheating. In this case, the fuel preheating channels 10 can then discharge directly into the combustion chamber 42 through corresponding outlets similar to the slots 28.

The embodiment of an industrial burner according to the invention illustrated in FIG. 5 is constructed to a great extent in the same way as the embodiment illustrated with reference to FIGS. 1 to 4. The same parts are therefore provided with the same reference numerals in FIG. 5 to make clear that a further explanation of them is unnecessary.

Whereas in the case of the embodiment of FIG. 1 the combustion chamber is laterally closed off directly by the inner jacket wall 5 the hollow cylindrical body 4, in the embodiment of FIG. 5 a separate pot-shaped or annular combustion chamber element 50 containing the combustion chamber 42 is provided. It is made of a suitable ceramic material and is inserted into the end of the internal space 6 of the hollow cylindrical body 4. The fuel chamber element 50 can be made of a different and, for example, more valuable and still more heat-resistant ceramic material than the hollow cylindrical body 4. It has a cylindrical wall portion 51 which is fastened to the inner jacket wall 5 of the body 4. In order to avoid the occurrence of strains and stresses from the different thermal expansion coefficients and in order to compensate for manufacturing tolerances, a resilient ceramic insert 52, for example of packed mineral fibers, is placed between the cylindrical wall portion 51 of the element 50 and the inner wall 5 of the body 4. On its gas outlet side the combustion chamber element 50 is tapered down at 53 to the dimensions of the jet nozzle in order to obtain a higher jet velocity.

On its side opposite the location of the jet nozzle 43 the combustion chamber element 50 is a rule open, so that the combustion air flowing out of the combustion air outlet slots 28 can flow into the combustion chamber 42 without hindrance. Configurations are also conceivable in which the combustion chamber element 50 has a throttling device at its inlet side, for example in the form of a perforated ceramic plate which has air inflow channels of suitable dimensions and distribution.

In the case of the embodiment of FIG. 5, again, fuel stage combustion is as a rule performed. A part of the combustion air channels 10 for this reason discharge in the already described way in the neighborhood of the jet nozzle 42 in the end boundary of the hollow cylindrical body 4. Besides, the combustion chamber element 50 can also be constituted without the constriction 53, as is also possible, in order to insert at the gas outlet side of the combustion chamber element 50 a perforated ceramic plate in order to obtain subdivision of the jet flow.

The third embodiment of a new industrial burner according to the invention illustrated in FIG. 6 corresponds also to a great extent to that of FIG. 1. Here also the same parts are designated by the same reference numerals and are not again described.

Whereas in the embodiment of FIG. 1 the fuel lance 34 was rigidly connected with the cap plate 35 and thereby with the metal casing 15, in the embodiment of FIG. 6 a flexible membrane 56 is provided between the cap plate 35 and the metal casing 15. A central tubular piece 57 is inserted and sealed in the membrane 56 and by it the fuel lance 34 is likewise connected and sealed to the membrane 56. A space 58 is formed in the cap piece 35 above the membrane 56. That space is connected to the atmosphere through a channel 59. The cap plate 55 and the membrane 56 are connected and sealed to a bellows 60 thus sealing off the fuel supply channel leading over the tubular piece 57 into the fuel lance 34. A compression spring 61 disposed in a corresponding bore in the cap plate 35 which is coaxial with the fuel lance 34 which is backed at one end against the screw plug 62 urges the membrane 56 and the fuel lance 34 in the direction of the jet nozzle 43.

At its end projecting into the combustion chamber 42 the fuel lance 34 is connected to a valve body 63 that has a conical exterior surface 64 which cooperates with the inwards facing annular surface of the nozzle body 44 operating after the manner of a valve seat. A ring gap is defined between the annular surface of the jet nozzle 44 and the external surface 64 of the tip of the fuel lance and the effective passage cross section of this ring gap depends upon the axial position of the valve body 63 and therefore of the fuel lance 34 with reference to the nozzle body 44.

Since the membrane 56 is exposed to the pressure in the combustion chamber 42 through the gap between the fuel lance 34 and the wall of the bore 32 and on its other side is under the influence of the compression spring 61, the bias pressure of which is adjustable by means of the screw plug 62, while the vent canal 59 makes possible an unhindered movement of the membrane, the burner illustrated in FIG. 6 can automatically equalize the pressure changes arising in the furnace chamber 1 and in the combustion chamber of the design illustrated in FIG. 6. Furthermore, by means of the screw plug 62 an optimum jet adjustment is possible when the burner is mounted in the furnace.

The ceramic hollow cylindrical body 4 can be manufactured as a one-piece extrusion product with a diameter sufficient for many industrial burners. Beginning with a certain outer diameter such a one-piece manufacture might be uneconomic, however. For such cases, the hollow cylindrical body 4a can be assembled from individually produced parts. This is described for an embodiment with reference to FIG. 7.

As can be seen in comparison with FIGS. 2 to 4, the hollow cylindrical body according to FIG. 7 has basically the same sector-shape distribution of the channels 9 and 10, which again are separated from each other by radial walls 11 and ring-shaped walls 12. The design is so constituted, however, that the hollow cylindrical body 4a is assembled from a number of similar hollow cylindrical sectors 66 which are joined to each other along flat radially running separation surfaces 67 and may if desired be cemented one to another. Each of the hollow cylindrical sectors 66 contains channels 9 and 10 distributed in sector-shaped groups of three and alternating with each other in the circumferential direction, so that in one sector-shaped region, similarly to FIGS. 2, 3 and 4, three channels of the same kind are adjacent to each other radially, and channels 9 and 10 are adjacent to each other circumferentially in every case.

Both in this embodiment and in the other described embodiments of the hollow cylindrical body the sector region allocated to combustion gas channels 9 or to combustion air channels 10 can contain more than three channels. It is also possible for more channels 9 or 10 to be next to each other in the circumferential direction, and it is also conceivable that in the embodiment according to FIG. 7 neighboring hollow cylindrical sectors 66 could be allocated to different media.

Figure 8:
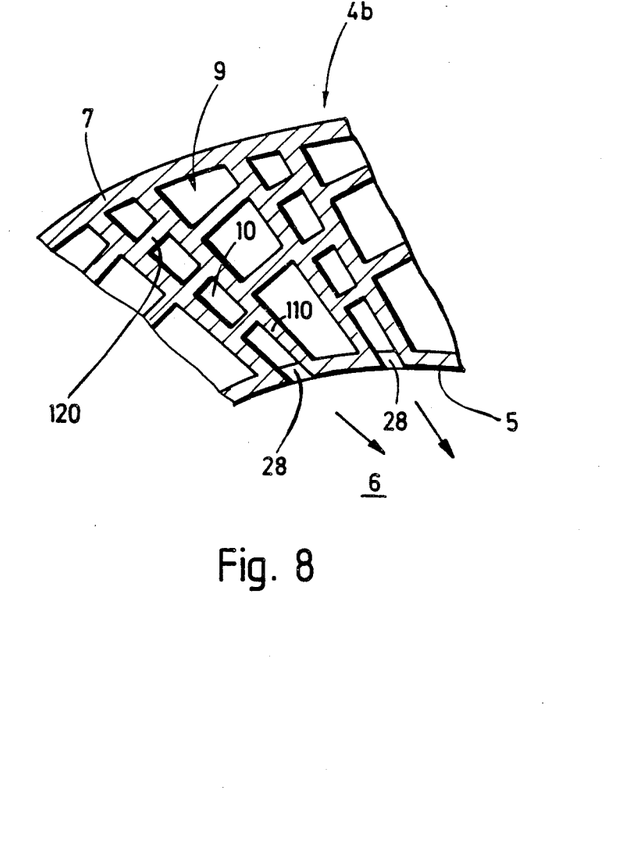
FIG. 8 is a portion of a cross section similar to FIG. 4 but on a larger scale of a portion of a ceramic hollow cylindrical body of a modified form for an industrial burner according to FIG. 1, FIG. 5 or FIG. 6.

In FIG. 8 there is shown a partial section of a further modified embodiment of a hollow cylindrical body 4b. Instead of the side walls 11 separating radially sequential groups of channels 9 and 10 in the other embodiments, the side walls 110 separating such channel sequences are here aligned on secants of the cylindrical outer jacket wall 7 of the hollow cylindrical body 4b, while the separating walls 120 between adjacent channels 9 and between adjacent channels 10 of a sequence run more or less at right angles to the walls 110. In this manner, it is possible for the channels 10 supplying the preheated combustion air through their outlet slots 28 into the internal space 6 surrounded by the inner wall 5 will discharge tangentially in such a manner that a swirling or whirling movement results for the combustion air flowing into the combustion chamber 42. That can lead to an improvement of the combustion conditions. Of course even in this embodiment, the hydraulic effective diameter of all channels 9 and the hydraulic effective diameter of all channels 10 must be the same.

Figure 9:
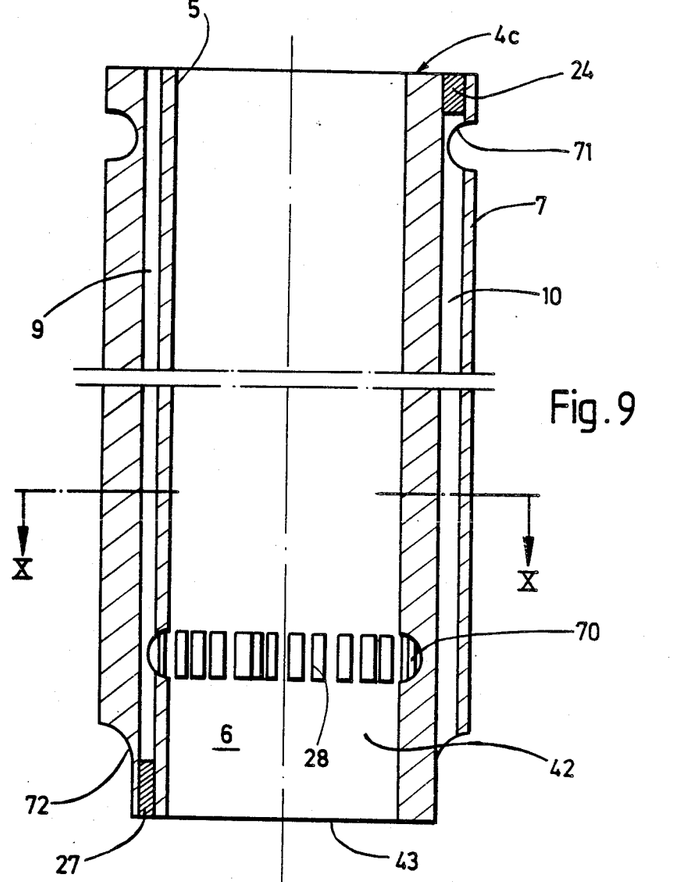
FIG. 9 is an axial cross section, in side view, of a further modified embodiment of the hollow cylindrical body of an industrial burner according to FIG. 1, FIG. 5 or FIG. 6.
Figure 10:
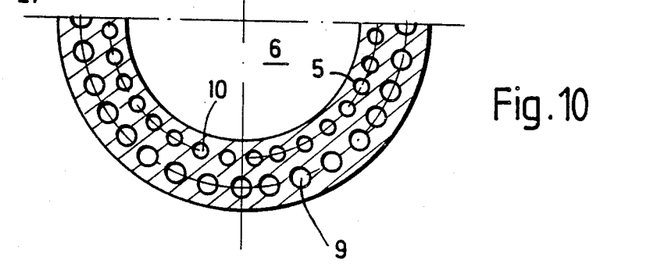
FIG. 10 is a cross section along the line X—X of FIG. 9, in partial view, of the hollow cylindrical body of FIG. 9.

In FIGS. 9 and 10, still another embodiment of a ceramic hollow cylindrical body 4c is illustrated which likewise can be produced as an extrusion product. In this case the channels 9 and 10 in the hollow cylindrical body 4c are cylindrical, with the channels 9 for the combustion product gases then having a larger diameter than the channels 10 for the combustion air which lie radially inwards. In order to open the channels 10 for the combustion air to the combustion chamber 42, it is sufficient in this case to machine an annularly running groove or open channel 70 in the inner jacket wall surface 5, for example a groove having a semicircular profile in cross section. Such a groove intersects the channels 10 so that these again discharge through slots 28.

In a similar manner for a lateral removal of the combustion product gases into the annular channel 18 of FIG. 1 at the other end in the region of the outer jacket wall 7, a similar groove 71 of semicircular cross section running around the outer surface of the ceramic body 4c may be machined into the body to intersect the channels 9 for combustion product gas outflow, which are blocked at 24 at the end surface of the ceramic body 4c. In this case the hollow cylindrical axially away from the jet nozzle 43 at 72 on the outer surface of the body 4c in order to provide inlets for the combustion product gases into the channels 9 which are laterally shielded from the jet nozzle. The jet nozzle itself is in this case provided directly by the cylindrical inner jacket wall 5 of the hollow cylindrical body 4c.

Such construction of the jet nozzle is naturally also possible in the previously described other embodiments of the hollow cylindrical body 4, 4a, 4b. This wide range of applicability also exists for the shaping of the hollow cylindrical body at 72.

The industrial burner described for example with reference to FIG. 1 is set in its own metal casing 15, by means of which it is fastened to the outer wall 16 of the industrial furnace. Especially in cases in which a greater heat producing capacity is necessary than can be obtained economically with a single burner, it can be useful to incorporate several of the industrial burners of one of the kinds described above in a burner unit that can then be installed as a unit in the industrial furnace. An example of such a combination is illustrated schematically in FIG. 11.

Figure 11:
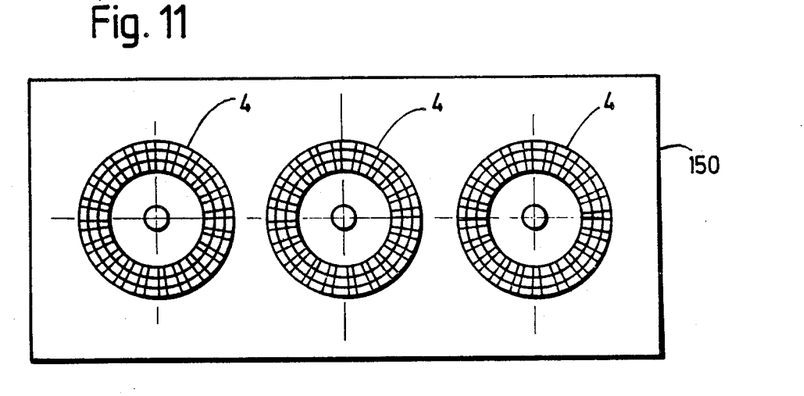
FIG. 11 is a schematic cross section through the hollow cylindrical bodies of the burner unit composed of three industrial burners according to FIG. 1, FIG. 5 or FIG. 6 in a common casing.

In a common metal casing 150, constituted in principle similarly to the metal casing 15 of FIG. 1, three industrial burners, for example like those of FIG. 1, are disposed one next to the other. Only their hollow cylindrical bodies 4 are illustrated in FIG. 11, this being a cross-sectional view about the middle of the hollow ceramic bodies. Each of these hollow cylindrical bodies 4 is equipped within the metallic casing 150 with corresponding inlet and outlet devices for the combustion air and for the combustion product gases. The configuration and construction of such input and output devices can be gathered directly from FIG. 1, so that further description of them is unnecessary.

Figure 12:
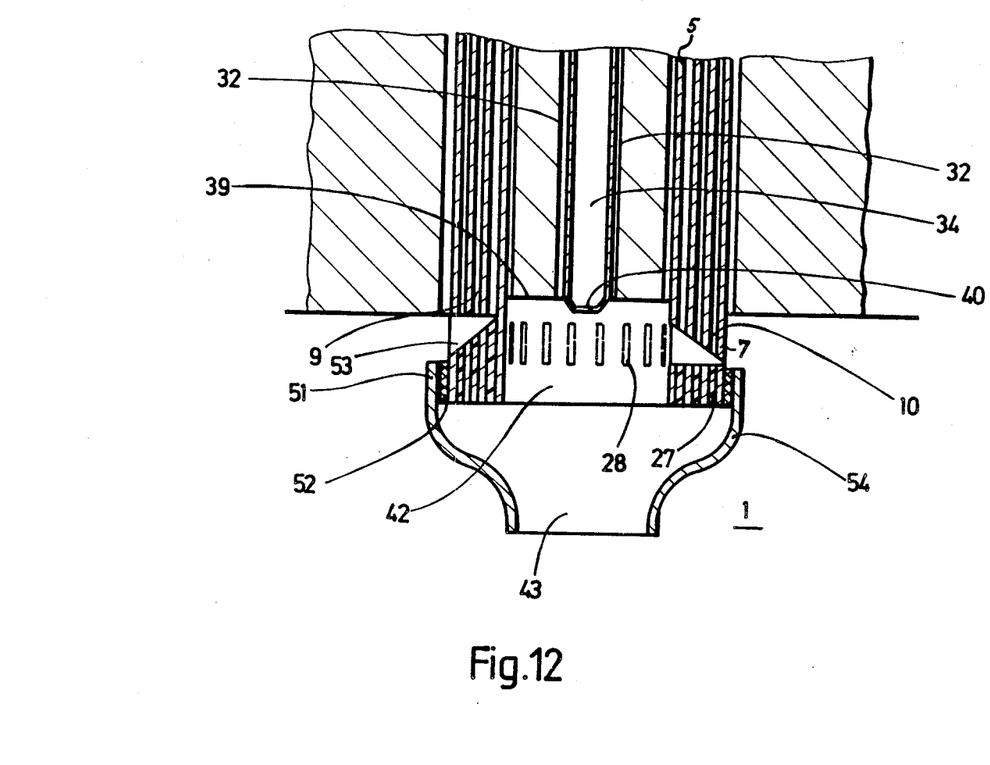
FIG. 12 is a partial view, in axial cross section, of a further modification of an industrial burner of the invention.

Still another embodiment of a new industrial burner according to the invention is illustrated in FIG. 12. Here again parts that are the same as parts shown in FIG. 1 are designated with the same reference numerals and not further explained.

In this embodiment, the pot-shaped ceramic combustion chamber element 50 is replaced by a basically similar ceramic combustion chamber element 54 which again has a cylindrical wall portion 51. The diameter of the cylindrical wall portion 51 is in this case, however, somewhat greater than the outer diameter of the outer jacket wall 7 of the hollow cylindrical body 4, so that the combustion chamber element 54 is applied and sealed with the interposition of the resilient ceramic insert 52 to the outer jacket wall 7 of the hollow cylindrical body 4. The insert 52 is for example made of packed-in mineral fibers.

The channels 9 for leading away the combustion product gases are laterally opened above the fuel chamber element 54 by sector-shaped slots 53 penetrating through the outer jacket wall 7 of the ceramic body 4 and they are closed off in the region of the neighboring end face of that ceramic body. The inflow of the combustion product gases into a recuperator portion of the hollow cylindrical body in this case takes place laterally. In this connection it should be remarked that such a lateral introduction of combustion product gas would also be possible in the previously mentioned embodiments of the industrial burner according to the invention.

The supplying of air into the combustion chamber 42 takes place again through the slots 28 passing through the inner wall jacket 5 of the ceramic body 4. Alternative embodiments are also conceivable in which instead of these radial outlet slots 28 an end face projection of combustion air into the combustion element 54 would be possible by omitting the end face closures of the channels 10 at 27. A combined combustion air supply through radial slots 27 arranged according to FIG. 12 and also through the end face of the ceramic body 4 by channels 10 remaining open at 27 is also possible.

It will therefore be seen that although the invention has been described with reference to particular illustrative embodiments, many modifications and variations are possible within the inventive concept.

I claim:

1. Industrial burner means for heating furnaces and other high heat treatment installation having recuperative air-preheating means and a combustion chamber means (42) constructed of ceramic material providing for an input thereto of fuel and air and a hot gas exit in the form of jet-producing nozzle means (43), and wherein:

said recuperative air-preheating means is constituted as a substantially cylindrical centrally hollow body (4, 4a, 4b) of ceramic material disposed coaxially with said combustion chamber means (42) and said nozzle means (43) thereof and of tubular construction containing a multiplicity of longitudinal channels for countercurrent flow of combustion-supporting air and combustion product gas through respective sets of channels (9, 10) interleaved for provision of wall parts capable of thermally coupling said respective sets of channels, said channels of said set for flow of combustion supporting air being connected a supply manifold of a source of said air flow located at an axial extremity of said substantially cylindrical body of tubular construction opposite to an axial extremity thereof connected to said combustion chamber means;

said channels (9, 10) of both of said sets of channels in said hollow cylindrical body being distributed annularly next to one another interleaved sets about the longitudinal axis of said hollow cylindrical body;

said hollow cylindrical body having an inner substantially cylindrical jacket wall (5) surrounding an inner substantially cylindrical space (6), and said combustion chamber means (42) being provided either directly at a said end of said hollow cylindrical body or in a position utilizing an end portion of said substantially cylindrical space for at least a portion of said combustion chamber means;

at least a portion of said channels (10) of said set for flow of combustion supporting air being connected at their flow output ends to said combustion chamber means and all of said channels (10) of said air flow set having outflow orifices at an end of said hollow cylindrical body in the vicinity of said combustion chamber means (42), and said nozzle means (43) being constituted, at least in part by structure either passing through said hollow cylindrical body or connected to said hollow cylindrical body or both passing through said hollow cylindrical body and connected thereto.

2. Industrial burner means according to claim 1, wherein said combustion chamber means (42) is constituted as a section of said substantially cylindrical space (6) within said hollow cylindrical body (4, 4a, 4b, 4c) and is laterally bounded directly by said inner jacket wall 5 of said hollow cylindrical body.

3. Industrial burner means according to claim 1, wherein said combustion chamber means (42) comprises at least an annular or pot shaped combustion chamber element (50) attached to said hollow cylindrical body (4, 4a, 4b, 4c).

4. Industrial burner means according to claim 3, wherein said combustion chamber element (50) is composed of a ceramic material different from the ceramic material of which said cylindrical hollow body is composed.

5. Industrial burner means according to claim 3, wherein said jet-producing nozzle means (43) is provided adjacent to said combustion chamber element (50) by incorporation therewith or attachment thereto.

6. Industrial burner means according to claim 4, wherein said jet-producing nozzle means (43) is provided adjacent to said combustion chamber element (50) by incorporation therewith or attachment thereto.

7. Industrial burner means according to claim 1, wherein said jet-producing nozzle means (43) comprises at least one ceramic nozzle body (44) connected to said hollow cylindrical body (4, 4a, 4b, 4c).

8. Industrial burner means according to claim 7, wherein said ceramic nozzle body is constituted as a nozzle ring (44) set into said inner cylindrical space (6) within said hollow cylindrical body (4, 4a, 4b, 4c), said nozzle ring (44) having an effective gas passage aperture, the area of which is less than the cross-sectional area of said inner cylindrical space (6).

9. Industrial burner means according to claim 7, wherein said nozzle body (44) has a plurality of separate nozzle apertures (46).

10. Industrial burner means according to claim 8, wherein portion of said channels (10) of said set of channels for flow of combustion supporting air are connected with supplemental air outlets (100) located in the immediate vicinity of said nozzle means (43).

11. Industrial burner means according to claim 10, wherein said supplemental air outlets (100) are located in the region of the end face of said hollow cylindrical body (4, 4a, 4b, 4c) at which said combustion chamber means is located.

12. Industrial burner means according to claim 1, wherein at the axial end of said combustion chamber means (42) opposite to the end at which said nozzle means (43) is situated, is closed off by at least one closure member (31) set in said inner space (6) of said hollow cylindrical body, which closure member is provided with means (32, 34) for supply of at least fuel for said combustion chamber means.

13. Industrial burner means according to claim 1, wherein said channels of said respective sets for flow of combustion product gas and combustion support air (9; 10) are disposed in an alternating arrangement of adjacently lying sectors of said hollow cylindrical body (4, 4a, 4b, 4c).

14. Industrial burner means according to claim 1, wherein all said channels of said set of channels for flow of combustion product gas and likewise all said channels of said set of channels for flow of combustion supporting air (9; 10) have the same hydraulic effective diameter ($d_n$), which in both cases lies in the range from 2 to 10 mm.

15. Industrial burner means according to claim 13, wherein said hollow cylindrical body (4a) is composed of at least two similarly shaped hollow cylindrical sectors (56).

16. Industrial burner means according to claim 1, wherein said hollow cylindrical body (4, 4a, 4b, 4c) is set into a separable casing (15) having connection means (18, 19; 25, 26) providing external connections with said sets of channels and out of which said hollow cylindrical body is removable in a direction opposite to the direction of operation of said jet-producing nozzle means (43).

17. Industrial burner means according to claim 16, wherein said burner means comprises a plurality of burners each having a said substantially cylindrical centrally-hollow body, each disposed coaxially with a said combustion chamber means (42) and nozzle means (43) all of said hollow cylindrical bodies (4) being disposed in a common casing (150).

18. Industrial burner means according to claim 1, wherein said inner space (6) surrounded by said hollow cylindrical body (4, 4a, 4b, 4c) contains fuel supply means disposed coaxially with the longitudinal axis (8) of said hollow cylindrical body, said fuel supply means having an axially shiftable supply element (34) by which there is constituted, together with said nozzle means (43) or with valve seat means (44), an adjustable valve for gases flowing into said nozzle means (43) and also having connected thereto near an end of said hollow cylindrical body opposite to the end at which said combustion chamber is located, a spring and membrane device (59, 61) by which said fuel supply element (34) is urged against said nozzle means (43) or against said valve seat means (44), while a membrane of said spring and membrane device is exposed on one side to the atmosphere and on the other side to the contents of said combustion chamber (42).

19. Industrial burner according to claim 1, wherein said hollow cylindrical body (4, 4a, 4b, 4c) is of extrusion press construction.

20. Industrial burner according to claim 14, wherein the parts (66) of said hollow cylindrical body are of extrusion press construction.

21. Industrial burner according to claim 1, wherein said hollow cylindrical body (4) consists of a construction in which said channels (9) of said set of channels for flow of combustion supporting air are of a configuration providing for discharge into said inner space surrounded by said hollow cylindrical body (4b) in a direction producing a swirling movement of said combustion supporting air in said combustion chamber (42).

* * * * *